US012548677B2

(12) United States Patent
Rennison-Jones et al.

(10) Patent No.: US 12,548,677 B2
(45) Date of Patent: Feb. 10, 2026

(54) COMPUTER IMPLEMENTED METHOD FOR QUANTIFYING AND PREDICTING THE PROGRESSION OF INTERSTITIAL LUNG DISEASE

(71) Applicant: Brainomix Limited, Oxford (GB)

(72) Inventors: Christian Rennison-Jones, Oxford (GB); Olivier Jean-Bernard Jérôme Joly, Oxford (GB); Peter George, Oxford (GB)

(73) Assignee: Brainomix Limited, Oxford (GB)

( * ) Notice: Subject to any disclaimer, the term of this patent is extended or adjusted under 35 U.S.C. 154(b) by 376 days.

(21) Appl. No.: 18/184,066

(22) Filed: Mar. 15, 2023

(65) Prior Publication Data
US 2023/0298756 A1    Sep. 21, 2023

(30) Foreign Application Priority Data
Mar. 18, 2022   (GB) ...................... 2203799

(51) Int. Cl.
*G16H 50/20* (2018.01)
*G16H 30/40* (2018.01)
*G16H 50/30* (2018.01)

(52) U.S. Cl.
CPC ............ *G16H 50/20* (2018.01); *G16H 30/40* (2018.01); *G16H 50/30* (2018.01)

(58) Field of Classification Search
None
See application file for complete search history.

(56) References Cited

U.S. PATENT DOCUMENTS

| 2019/0172197 A1 | 6/2019 | Buckler et al. |
| 2021/0224987 A1 | 7/2021 | Smith |
| 2022/0092791 A1 | 3/2022 | Dougherty et al. |

FOREIGN PATENT DOCUMENTS

| CN | 111598895 A | | 8/2020 |
| CN | 112001921 A | * | 11/2020 |
| KR | 20200101772 A | * | 2/2019 |
| WO | 2019000455 A1 | | 1/2019 |

OTHER PUBLICATIONS

Singadkar et al (Automatic lung segmentation for the inclusion of juxtapleural nodules and pulmonary vessels using curvature based border correction 2021).*

(Continued)

*Primary Examiner* — Fan Zhang
(74) *Attorney, Agent, or Firm* — Bookoff McAndrews, PLLC

(57) ABSTRACT

A computer implemented method for quantifying and predicting the progression of interstitial lung disease is disclosed herein. The method comprises obtaining at least one image based on a scan of at least a part of a patient's lung, segmenting the image to obtain a lung mask defining the periphery of the lung and to identify structures within the lung mask, and applying a weighting to the identified structures based on the relative position of the structures relative to the lung periphery to obtain a weighted score. The method may then comprise quantifying the extent of interstitial lung disease, and/or predicting the progression of interstitial lung disease, based on the weighted score.

15 Claims, 5 Drawing Sheets

(56) References Cited

OTHER PUBLICATIONS

Christe et al (Computer-Aided Diagnosis of Pulmonary Fibrosis Using Deep Learning and CT Images 2019).*
Gao et al., Holistic Interstitial Lung Disease Detection using Deep Convolutional Neural Networks: Multi-label Learning and Unordered Pooling, Cornell University Library, arxiv.org, Jan. 19, 2017, 21 pages, Ithaca, NY.
Noor et al., Comparing Watershed and FCM Segmentation in Detecting Reticular Pattern for Interstitial Lung Disease, 2012 IEEE EMBS International Conference on Biomedical Engineering and Sciences, 6 pages, Dec. 17-19, 2012, Langkawi.
Bian Zijian et al., "Review of anatomic segmentation methods in thoracic CT images", Journal of Image and Graphics, 2018, 23 (10), pp. 1450-1471, DOI: 10.11834/jig.180067.

* cited by examiner

COMPUTER IMPLEMENTED METHOD FOR QUANTIFYING AND PREDICTING THE PROGRESSION OF INTERSTITIAL LUNG DISEASE

CROSS-REFERENCE TO RELATED APPLICATIONS

This U.S. Patent Nonprovisional Application claims the benefit of priority to United Kingdom Patent Application No. 2203799.8, filed on Mar. 18, 2022, which is incorporated herein by reference in its entirety

FIELD OF THE INVENTION

The present disclosure relates to a computer implemented method for quantifying the extent of interstitial lung disease and/or predicting its progression over time.

BACKGROUND

The interstitial lung diseases (ILDs) are a group of disorders in which the architecture of the lungs is disrupted; in some cases, this leads to irreversible and progressive fibrosis. Idiopathic pulmonary fibrosis (IPF) is the archetypal progressive fibrosing lung disease in which there is relentless decline in lung function and an estimated life expectancy of five years from diagnosis. Other non-IPF fibrotic interstitial lung diseases also progress at a similar rate with equally poor prognosis.

A conventional technique for measuring lung function, and thereby the progression of ILDs, is a forced vital capacity (FVC) test, also known as a spirometry test. This involves measuring the amount of air that an individual is able to forcibly exhale from his/her lungs after taking the deepest breath they can. The testing may involve placement of a special mask over the patient's face. The patient is then asked to breath in and out—inhale and exhale—as forcibly as they can, while measurements are collected.

Two antifibrotic drugs, nintedanib and pirfenidone reduce the rate of lung function (FVC) decline in patients with IPF and progressive fibrotic non-IPF ILD. However, even in the context of IPF, the most homogeneous of the ILDs, there is individual variability in disease trajectory such that it is not possible to provide prognostic information at diagnosis. Furthermore, the currently accepted primary endpoint in ILD clinical trials, change in FVC, is afflicted by measurement variability of at least 10%. It is no longer ethical to perform placebo-controlled trials for patients with IPF and progressive fibrosing ILD, and so demonstrating incremental improvements above standard of care poses a major challenge to the pharmaceutical industry.

There is therefore a pressing need to discover and validate a new technique for determining and prognosing ILD such that clinical trials can be enriched for patients more likely to deteriorate. This will allow clinical trials to be shortened, sample sizes to be reduced and therapeutic responses above standard of care to be identified.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided a computer implemented method for quantifying the extent of interstitial lung disease (and optionally other parenchymal lung abnormalities) and predicting progression over time. The computer-implemented method comprises obtaining at least one image based on a scan of at least a part of a patient's lung, segmenting the image to obtain a lung mask 200 defining the periphery of the lung and to identify structures within the lung mask 200, and applying a weighting to the identified structures based on the relative position of the structures relative to the lung periphery to obtain a weighted score. Optionally the method comprises quantifying current interstitial lung disease extent, and/or predicting its progression over time, based on the weighted score.

Advantageously, it has been found that the computer implemented method for predicting the progression of interstitial lung disease can not only identify patients whose disease is progressing or likely to progress, it can also identify patients whose disease is progressing with stable lung function addressing the challenge of FVC variability. Furthermore, by identifying patients whose disease is likely to progress, the method can be used to identify patients suitable for participation in novel clinical trials. Moreover, the computer implemented method may quantify current fibrotic disease extent (e.g., the current extent of ILD such as IPF as well as other parenchymal lung abnormalities) as well as or potentially even better than existing metrics such as lung function or radiologist assessment. For example, the computer implemented method may comprise quantifying the current extent of interstitial lung disease in units of volume or percentage of the lung affected.

Applying a weighting to the identified structures based on the relative position of the identified structures relative to the lung periphery to obtain a weighted score may comprise applying a weighting only if the identified structure is within a selected threshold distance and/or a selected distance range of the lung periphery. For example, the selected threshold distance may be a distance of e.g., less than 1 to 2 cm, and/or the selected distance range may be e.g., within 0.1 to 2 cm of the lung periphery. For example, a weighting of zero may be applied to regions that are identified as being outside of the lung.

Segmenting the image to obtain a lung mask defining the periphery of the lung may comprise determining the lung periphery by identifying the lung pleural boundary. The lung mask may identify portions of the image which are part of the normal lung parenchyma. Identifying the lung mask permits (1) calculation of the lung periphery weights relative to the edge of the lung and (2) quantification of the total volume of the lung so that disease extent may be expressed as a percentage (e.g., disease extent volume/total lung volume=disease extent fraction).

Segmenting the image to identify structures within the lung mask may comprise identifying reticulo-vascular structures comprising at least one of: vessels (such as pulmonary blood vessels) and reticulation. Optionally, hyperlucent regions, such as airways, ground glass opacification, emphysema or cystic airspaces may also be segmented. Segmenting the image to identify structures within the lung mask may additionally or alternatively comprise identifying lung masses and then explicitly discounting them. Lung masses are features that are considered to be inside the lung, but these regions are not considered to be related to ILD. This means that any identified lung masses are included as part of the lung mask (and so are included in calculations of the total lung volume), but the masses are never considered to be a reticulo-vascular structure or a hyperlucent structure (so are not included in calculations of fibrotic disease volume i.e., lung masses are always given a weighting of zero).

The computer implemented method may further comprise dividing at least one image into a plurality of different portions such as pixels or voxels, and wherein applying a weighting to the identified structures based on the relative position of the structures relative to the lung periphery to obtain a weighted score comprises applying a weighting to each portion of the image comprising an identified structure based on the relative position of the identified structure relative to the lung periphery. For example, a weighting of zero may be applied to features of the image not identified as lung tissue.

Predicting the progression of interstitial lung disease or quantifying current disease extent based on the sum of the weighted structure scores may comprise predicting the progression of interstitial lung disease based on the sum of the weighted structure scores for all the portions of the image.

In examples where each portion of the image comprises a voxel, segmenting the image to obtain a lung mask defining the periphery of the lung, and/or segmenting the image to identify structure within the lung mask may comprise obtaining normalised raw image data of a scan of a patient's lung and outputting class probabilities for each voxel. The method may further comprise multiplying the sum of the weighted structure scores by the volume of each voxel, and may further comprise dividing this value by the total number of lung voxels considered in the calculation in order to obtain a normalised quantification of disease extent as a percentage. Advantageously this may obtain a standardised score to take into account acquisition resolution.

Obtaining at least one image based on a scan of at least a part of a patient's lung may comprise obtaining a plurality of slices through a patient's lung. It will be understood that the plurality of slices may be obtained from a CT scanner. Each slice may represent a scan through a respective part of the patient's lung. The method may further comprise creating a three-dimensional model based on the plurality of slices through a patient's lung. Each slice preferably has a thickness ≤3 mm since if the slice thickness is too high, structures of interest may not be visible in the scan.

Segmenting the image to obtain a lung mask defining the periphery of the lung may comprise segmenting each slice to obtain a lung mask defining the periphery of the lung for each slice. Segmenting the image to identify structures within the lung mask may comprise segmenting each slice to identify structures within the lung mask for each slice. The computer implemented method may further comprise creating a three-dimensional model based on the plurality of slices through a patient's lung and feeding the lung mask and identified structure for each slice into the three-dimensional model. Applying a weighting to the identified structures based on the relative position of the structures relative to the lung periphery to obtain a weighted score may comprise determining the relative position of the identified structures relative to the periphery of the three-dimensional lung mask.

Additionally, or alternatively, obtaining at least one image based on a scan of at least a part of a patient's lung may comprise receiving a three-dimensional model of a patient's lung. In such examples, segmenting the image to obtain a lung mask defining the periphery of the lung may comprise segmenting the three-dimensional model to obtain a three-dimensional lung mask defining the periphery of the lung, and/or segmenting the image to identify structures within the lung mask may comprise segmenting the three-dimensional model to identify structures within the three-dimensional lung mask. Applying a weighting to the identified structures based on the relative position of the structures relative to the lung periphery to obtain a weighted score may comprise determining the relative position of the identified structures relative to the periphery of the three-dimensional lung mask.

Determining the relative position of the identified structures within the three-dimensional model may comprise applying a distance transform such as a Euclidean transform to determine the distance from the lung periphery of the three-dimensional lung mask.

In another aspect there is provided a computer readable non-transitory storage medium comprising a program for a computer configured to cause a processor to perform the method described above.

In another aspect there is provided a method of training a machine learning model such as a convolutional neural network (CNN) to identify structures within the lung. The method may comprise training a machine learning model based on a dataset of CT scans of full lungs with corresponding labels for any of four classes, wherein the four classes comprise background (corresponding to non-lung tissue), lung parenchyma (corresponding to normal, healthy-looking lung tissue), lung reticulo-vascular structures (corresponding to blood vessels, as well as other bright long and thin (reticular) structures that appear in fibrosis cases) and lung masses (corresponding to any abnormal opaque mass-like structures that are not clinically relevant to ILD). Optionally there may be a fifth class comprising hyperlucent structures.

BRIEF DESCRIPTION OF DRAWINGS

Embodiments of the disclosure will now be described, by way of example only, with reference to the accompanying drawings, in which.

SPECIFIC DESCRIPTION

Embodiments of the disclosure demonstrate how a baseline CT scan can be used to quantify current fibrotic disease extent and predict outcomes in patients with ILD such as IPF better than FVC even when controlling for lung function parameters. The baseline CT scan can be analysed to identify particular structures within lung tissue. In particular, structures associated with fibrosis, such as blood vessels and thin (reticular) structures are identified. Embodiments may also comprise identifying hyperlucent (low-density) structures within the lung related to ILD, such as airways and cystic airspaces. Based on the presence and location of these identified structures, the severity and progression of ILD can be predicted using a trained machine learning model.

Advantageously, combining this imagining technique with FVC testing may be synergistic as they may identify independent but complementary factors associated with outcomes. In the setting of a clinical trial, combining this imaging technique with physiology may improve patient selection and definition of treatment response compared to traditional clinico-physiological markers alone.

Figure 1:
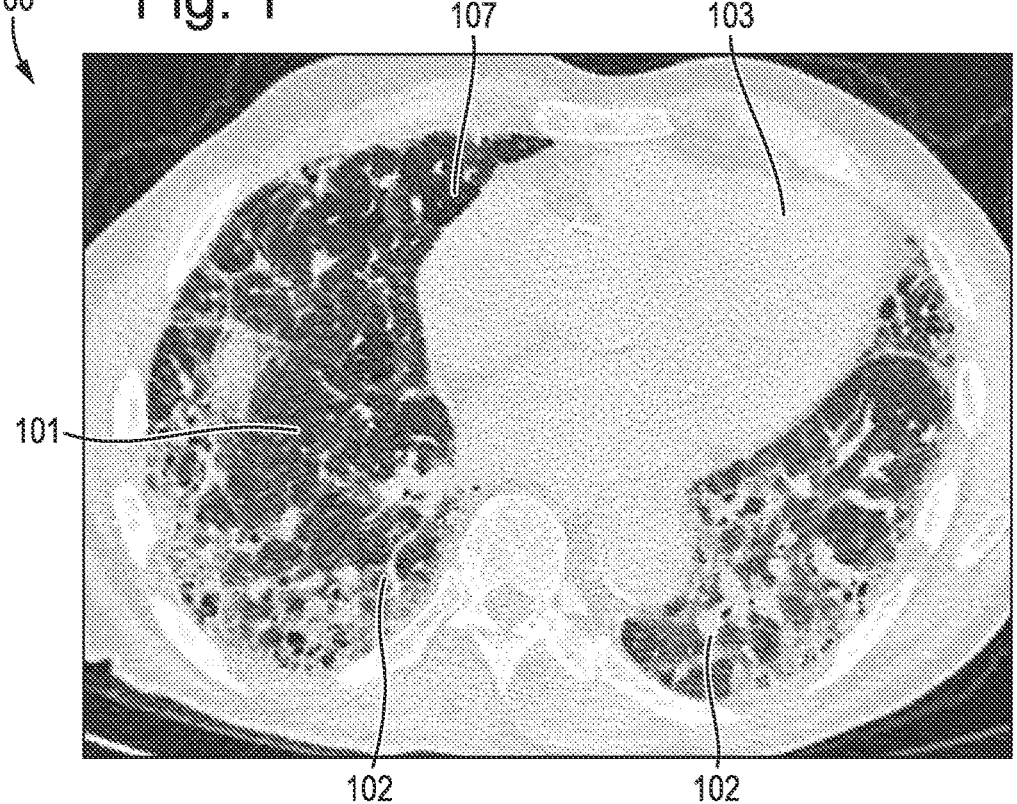
FIG. 1 shows a slice (cross-section) of a CT scan of a patient's lung.
Figure 4A:
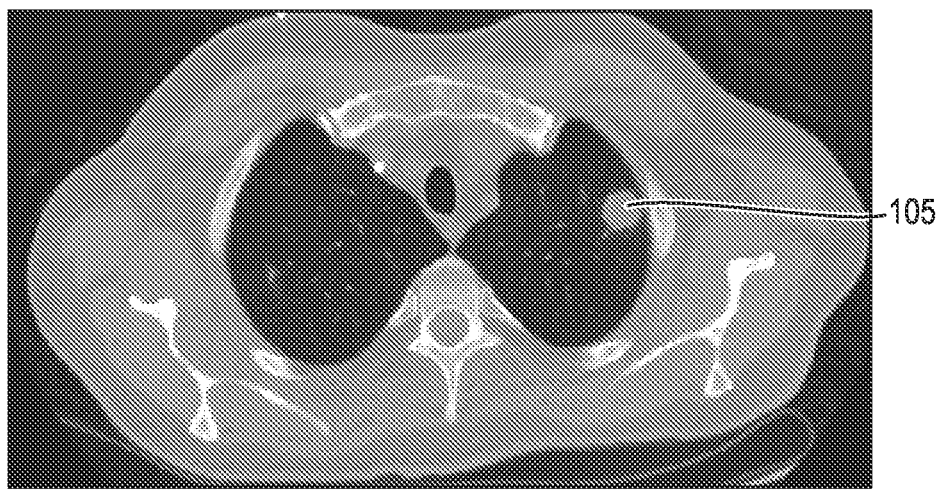
FIG. 4A shows another slice (cross-section) of a CT scan of a patient's lung.
Figure 4B:
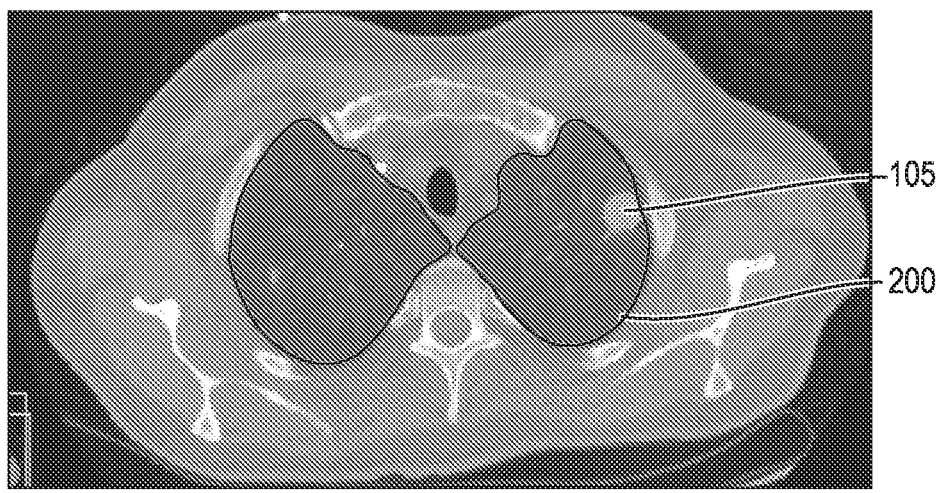
FIG. 4B shows the slice of FIG. 4A with a lung mask applied to regions of the scan showing the patient's lung including a lung mass.
Figure 4C:
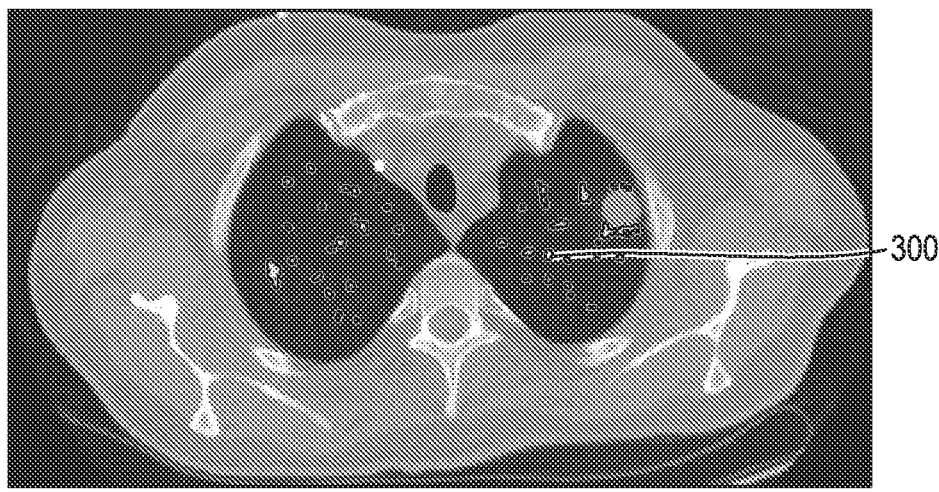
FIG. 4C shows the slice of FIG. 4A which a mask applied to reticulo-vascular features only.

FIG. 1 shows a slice (cross-section) of a CT scan 100 of a patient's lung. This example image 100 was obtained from the Open Source Imaging Consortium (OSIC) database. The image 100 shows a cross-section of a patient's lung. A number of structures are visible within the lung tissue. First, there is background non-lung tissue 103. This comprises anything not relevant to the lung such as other organs and objects outside the body. Second there is lung parenchyma 101 which may include normal, healthy-looking lung tissue that is not a blood vessel, including airways inside the lung. Third there is lung reticulo-vascular structures 102 which may include blood vessels, as well as other bright long and thin (reticular) structures that appear in fibrosis cases. For example, the reticulo-vascular structure 102 may comprise pulmonary blood vessels andreticulation. And finally, there are lung masses 105 (as shown in FIGS. 4A to 4C as described below in more detail) which may be any abnormal opaque mass-like structures that are not clinically relevant to ILD. These could sometimes be tumours or coincidental benign structures that don't look like typical healthy tissue. In any case they are not related to any fibrosis in the scan but may appear in the same scan inside the lung. Optionally, hyperlucent regions 107, such as airways or cystic airspaces may also be identified as another class of structure.

Surprisingly it has been found that by identifying the presence and location of the lung reticulo-vascular structures 102 the progression of ILD can be predicted.

Figure 2:
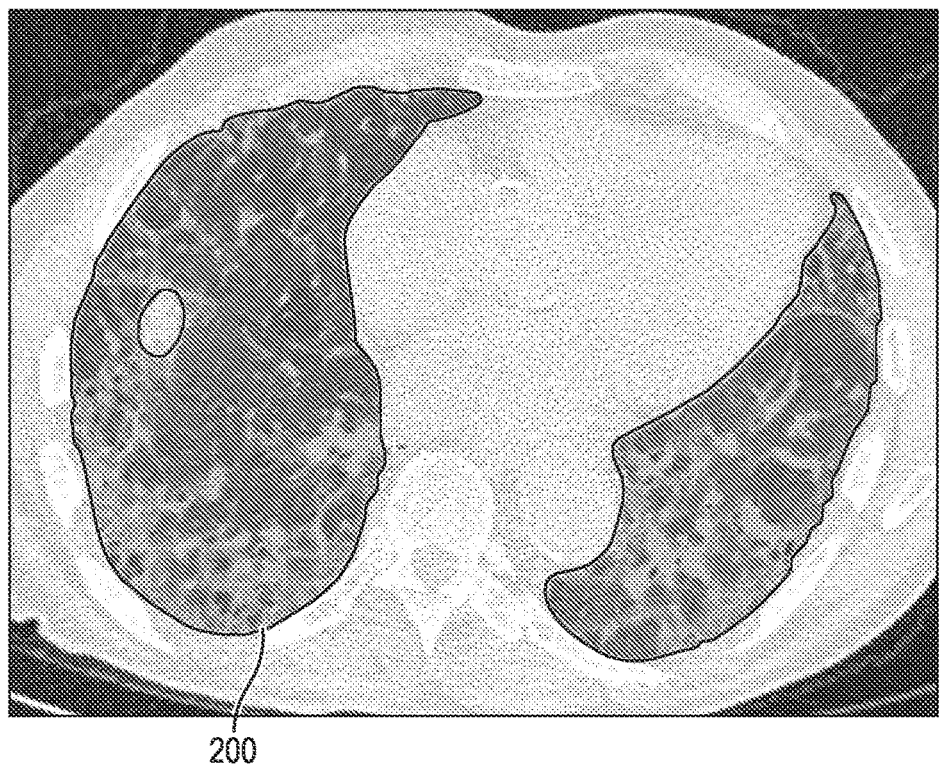
FIG. 2 shows the slice of FIG. 1 with a lung mask applied to regions of the scan showing the patient's lung.

In more detail, the image 100 shown in FIG. 1 may be divided into a number of portions, for example pixels or voxels. Image analysis may be performed on the image 100 by applying a machine learning model to obtain a lung mask 200 as shown in FIG. 2 defining the region inside the periphery of the lung structures (e.g., the periphery of the lung parenchyma 101, reticulo-vascular structures 102 and lung masses 105) and the non-lung background regions (such as the background non-lung tissue 103). The image analysis may also apply a second mask identifying reticulo-vascular structures 102 within the lung mask 200. Other features such as lung masses 105 may be recognised so that these can be explicitly discounted. This may advantageously also mean that any machine learning model is more robust and can give sensible outputs in cases where there is no fibrosis.

An example machine learning model to obtain the lung mask 200 and identify the reticulo-vascular structures may be a convolutional neural network (CNN) such as two-dimensional UNet which takes an axial slice of a scan and outputs the segmentation for the slice. This U-Net model may comprise a variable number of levels of blocks, for example four levels of blocks containing a variable number of (e.g., two) convolutional layers with batch normalization and ReLU activation function, and one max pooling layer in the encoding part and up-convolutional layers in the decoding part. The number of levels of blocks and convolutional layers may be tuned to alter how well the architecture performs, and may depend on the use case and may change as the training data changes. The number of convolutional filters in each block may be 32, 64, 128, and 256. The bottleneck layer may have 512 convolutional filters. From the encoding layers, skip connections are used to the corresponding layers in the decoding part. The input image may be 2D CT scan of a slice of a patient's lung. The output may be a multi-channel probability map of abnormality regions with the same size as the input image. The channels can be transformed intobinary segmentation masks by thresholding. Of course, any other segmentation architecture could be used at this stage, including three-dimensional architectures.

A weighting may then be applied to the identified reticulo-vascular structures 102 based on the relative position of the reticulo-vascular structures 102 relative to the lung periphery to obtain a weighted score. The weighted score may then be used to quantify the current extend of fibrotic disease and/or predict the progression of ILD.

Preferably the weighting applied to the identified reticulo-vascular structures 102 is a function of the distance from the lung periphery. In some examples the weighting may be a binary weighting. In such examples, the weighting may only be applied if the identified reticulo-vascular structures 102 are within a selected threshold distance of the lung periphery, for example, less than 2 cm from the lung periphery. In some examples the weighting may only be applied if the identified reticulo-vascular structures 102 are within a selected threshold range of the lung periphery, for example within a range of 0.1 cm to 2 cm from the lung periphery.

Figure 3:
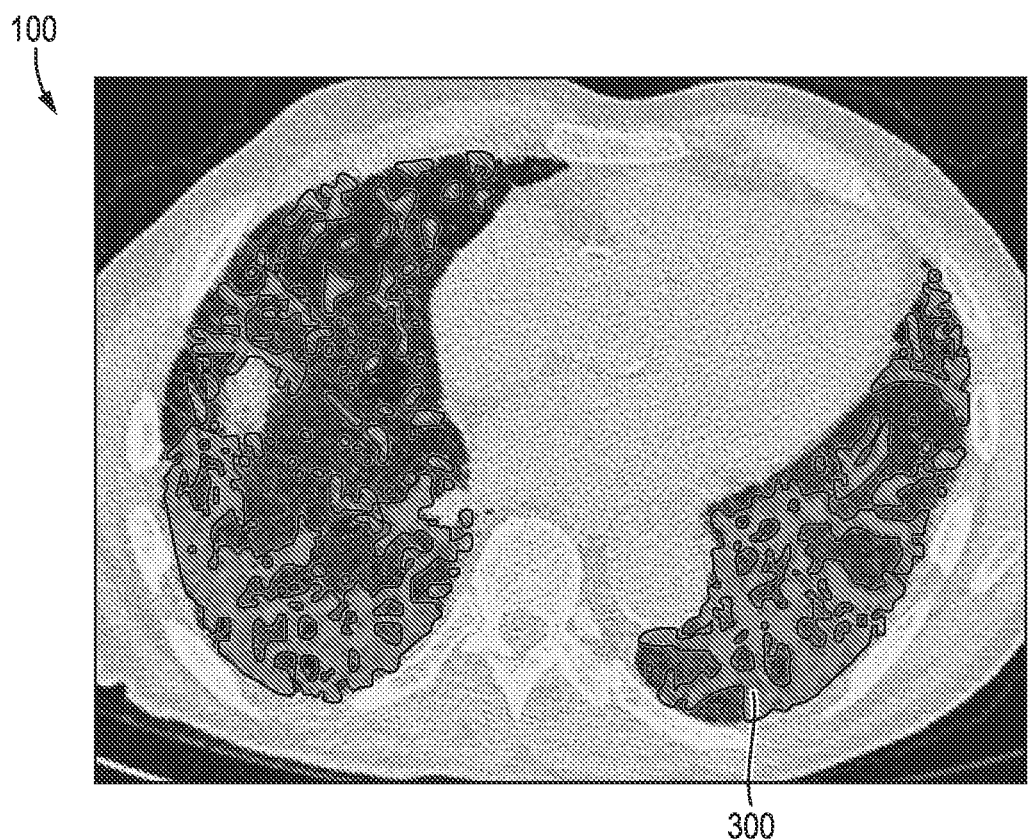
FIG. 3 shows the slice of FIG. 1 with a mask applied to regions of the scan showing identified structure.

It will be understood that although FIGS. 1 to 3 show a two-dimensional scan through a patient's lung, the method may be applied in three-dimensions, for example so that the weighting may be applied based on the three-dimensional closest distance of the reticulo-vascular structure 102 from the lung periphery. Either two-dimensional (slice-wise) or three-dimensional (whole volume) architectures could be used. Two-dimensional architectures can also take multiple channels of information such as a sliding window of neighbouring slices or a max/min intensity projection of nearby slices. This can give the model more context about the other slices around the one being segmented and thus improve the results. This may be performed by extending the input size of the convolutional neural network (CNN) architecture to accept images with multiple channels of information (similar to how an RGB image contains three channels of data corresponding to red green blue). In this example the additional channels will have different features (e.g., central slice in first channel, local maximum intensity projection in second channel, local minimum intensity projection in third channel). The CNN will need to be trained with these channels.

If the method is applied in three-dimensions, the slices may then be reconstructed (once the model has been applied to the two-dimensional slices to segment the image to obtain a lung mask 200 and identify reticulo-vascular structures within the lung) together to get a three-dimensional binary lung mask 200 for the whole CT scan. This lung mask may then be used as an input to a three-dimensional Euclidean distance transform which works out the shortest distance in three-dimensions from each voxel to the edge of the lung. The output is then a three-dimensional distance map which stores each voxel's distance from the lung periphery. Note that this is not a slice-wise distance but a volumetric distance.

The Euclidean transform is a well-established image processing technique that takes a binary array (e.g., three-dimensional) and works out the distance from each '1' voxel to the closest '0' voxel through exhaustively checking the distances from each '1' voxel to every '0' voxel. Thus, when a distance transform to the lung mask 200 is applied, the '1' voxels are the highlighted lung voxels (as shown in FIG. 2) and we calculate the distance to the closest non-lung '0' voxel for each voxel in the lung. This distance takes into account the physical spacing of the voxels in the scan so that the distances are returned in e.g., cm.

It will be understood that in some examples other types of distance transform (e.g., Manhattan) that would for example be less precise but potentially quicker to compute may be used, so any type of distance transform could be done in this step depending on the desired accuracy of the resulting distances.

Alternatively, in some examples, instead of uprocessing data slice by slice, if a three-dimensional architecture is used, three-dimensional image data may be fed directly into the model, which can perform segmentation in three-dimensions and then output a three-dimensional segmentation.

The distance map then acts as an input to the weighting function. The weighting function could be binary (e.g., all identified reticulo-vascular voxels with a distance less than Xcm are given a weight of one and all other voxels are given a weight of zero and are not considered) or a continuous function such as a linear or exponential function of distance from the lung periphery. The weighting may also take into account the volume of each voxel, for example by multiplying the weighting by the volume of each voxel. Non-lung voxels may also be considered differently to voxels within the lung mask 200 e.g., always given a weight of zero.

The best values for X have been found to be in a range of 0.1 to 2 cm, preferably a range of 0.5 to 1.5 cm, more preferably wherein X is 1 cm. Once X increases to more than 2 cm the WRV score becomes no more predictive than weighting all RV voxels equally regardless of position within the lung. The sweet spot seems to be around 1 cm and the more you move away from this value in either direction, the less reliable the weighted score becomes.

To get a final weighted score for a scan, the calculated weights of all of the identified reticulo-vascular voxels in the scan may be summed.

The model (such as a two-dimensional UNet) may be a multi-class model that is trained to classify each voxel in an input array as one of four (or optionally five) mutually exclusive tissue types:

Background—non-lung tissue. Anything not relevant to the lung such as other organs and objects outside the body.

Lung parenchyma—normal, healthy-looking lung tissue that is not a blood vessel, including airways inside the lung.

Lung reticulo-vascular structures—blood vessels, as well as other bright long and thin (reticular) structures that appear in fibrosis cases.

Lung masses—any abnormal opaque mass-like structures that are not clinically relevant to ILD. These could sometimes be tumours but in an ILD population is more likely to be coincidental benign structures that don't look like typical healthy tissue. It has surprisingly been found that it may be important to identify such lung masses which are not related to any fibrosis in the scan but may appear in the same scan inside the lung. These need to be detected so that they can be discounted. It also means that the model is more robust and can give sensible outputs in cases where there is no fibrosis.

Optionally hyperlucent structures—such as airways, emphysema or cystic airspaces.

The model may thus take the normalised raw image data of the scan and output multi-channel class probabilities for each voxel. Which class has the highest probability for each voxel is then calculated, providing a label map array (segmentation) of the same size as the model input, where the values of the array specify the most likely tissue class for each voxel (i.e., 0=background, 1=parenchyma, 2=RV, 3=masses/nodules, 4=hyperlucent).

The label map is then transformed into the lung mask 200 (as shown in FIG. 2 and FIG. 4B) and the reticulo-vascular mask (as shown in FIG. 3 and FIG. 4C) as follows:

Lung mask 200 (as shown in FIG. 2 and FIG. 4B): a new binary mask is constructed where any voxels segmented as lung parenchyma, reticulo-vascular regions, hyperlucent regions and lung masses are set to 1 and background voxels are 0.

Reticulo-vascular mask 300 (as shown in FIG. 3 and FIG. 4C): a new binary mask is constructed where any voxels segmented as reticulo-vascular tissue are set to 1 and all other voxels are 0.

Optionally, any reticulo-vascular structures 102 identified outside of the lung mask 200 may be automatically removed and are considered to be background non-lung tissue 103. The lung mask 200 may be defined by the presence of one of parenchyma 101, lung reticulo-vascular structures 102, lung hyperlucent structures 107 and lung masses 105 so by definition such structures cannot occur outside of the lung. In some examples the method may comprise post-processing steps to clean the lung mask 200 and remove any false-positive regions.

The model is trained on a dataset of CT scans of the full lungs with corresponding manual labels for the four classes mentioned above. This dataset may be obtained from the Open Source Imaging Consortium (OSIC) database. The training set has a mix of healthy scans as well as scans containing lung masses, so that the model can learn what typical lung parenchyma and vessels look like, as well as how to identify masses. All the training scans may have an axial slice thickness ≤3 mm since if the slice thickness is too high, the reticulo-vascular structures will not be visible in the scan. The dataset has a variety of acquisition parameters, reconstruction kernels and contains both contrast-enhanced and non-contrast enhanced scans to provide a trained model that can generalise well.

The model is not trained on scans with fibrosis although in some examples the model may be trained on scans with fibrosis labelled and optionally these may be segmented separately and used (optionally exclusively) to obtain a weighted score for predicting the progression of interstitial lung disease. As will be described in more detail below with reference to FIG. 5, even without specifically training the model using examples of fibrosis, the model has learned what healthy lungs look like. This means that when the model sees a fibrotic reticular structure, it segments it as a reticulo-vascular structure because reticulation appears visually similar to vessels (in terms of intensity and shape). Similarly, the model is able to identify vessels that are being pulled apart (traction) due to fibrosis, because vessels undergoing traction are still clearly vascular structures (the vessels will just be more easily visible at the periphery compared to a healthy patient).

FIGS. 4A to 4C show example slices with a small mass (nodule) 105. As with the examples of FIGS. 1 to 3, in FIG. 4B a lung mask 200 is overlaid in green. As shown in FIG. 4C, a mask 300 identifying reticulo-vascular structures is overlaid in red. It can be seen how the lung mass 105 is included in lung mask 200 but not in the reticulo-vascular mask 300.

Figure 5:
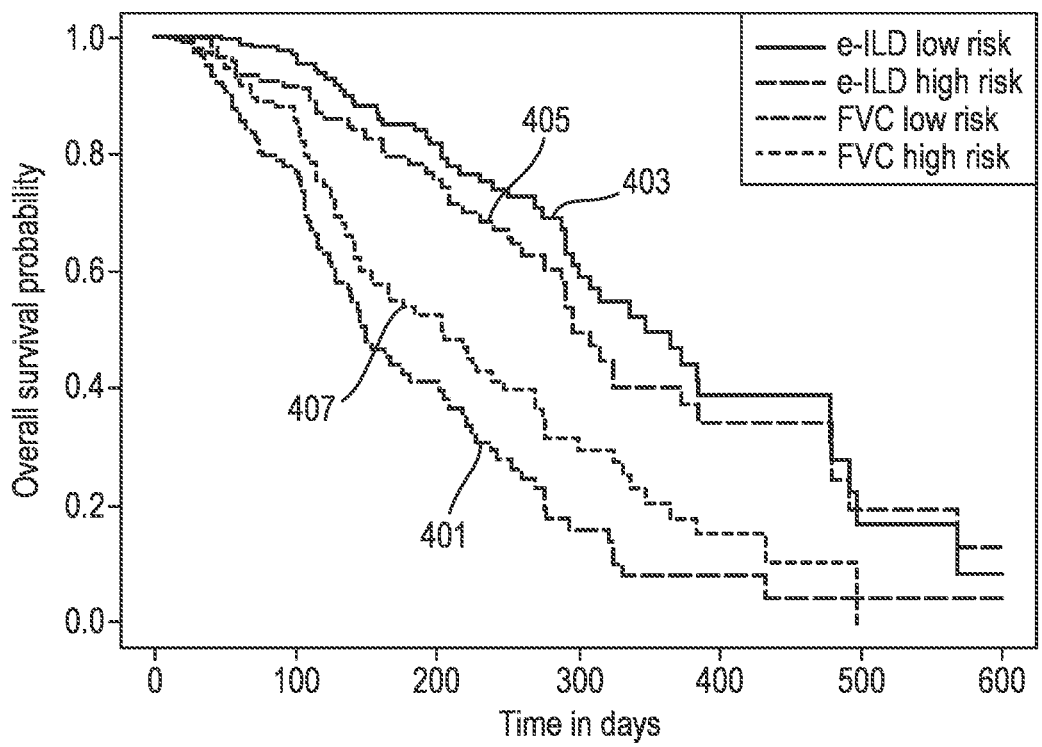
FIG. 5 shows a graph of the probability of transplant-free survival for patients categorised as either low-risk or high-risk according to a FVC test compared to methods of the present disclosure.

FIG. 5 shows a graph of the probability of transplant-free survival for patients categorised as either low-risk or high-risk according to a FVC test compared to methods of the present disclosure ("e-ILD"). Using the OSIC database, the method described above was applied to analyse CT scans from patients with a diagnosis of IPF or combined pulmonary fibrosis and emphysema (CPFE). Only those with full lung coverage and contemporaneous FVC and diffusion capacity of the lung for carbon monoxide (DLco) measurements (within 12 weeks of acquisition).

The input to the model ("e-ILD") is the 3D image data, from a single CT scan, without any other clinical information. The model, as described above, segments the lung pleural boundary, identifying voxels which are part of the normal lung parenchyma and those which comprise additional structures such as vessels, reticulation, or hyperlucent regions (airways or cystic airspaces). The output of the processing includes a weighted score which quantifies the extent of the lung affected by reticulo-vascular abnormalities, weighting regions of the lung more highly than others.

Analysis was restricted to 278 patients (296 baseline CT series) with;
IPF or IPF/CPFE diagnosis
A valid baseline study
Patients with a valid baseline and a valid follow-up study were included in the follow-up analysis (mean interval 54 weeks).

A study was considered valid if it met the following conditions:
Has one or more primary, raw CT series with full coverage of the lung and slice thickness<=3 mm.
Patient has an FVC measurement and a DLCO measurement within 12 weeks of the study acquisition week.

Transplant free survival was used as a surrogate for lung function decline in patients with IPF as the primary endpoint for analyses. Patients without vital status data were censored at the time of the last datapoint. Cox proportional hazards regression was used to model the relationship between lung function tests, identified reticulo-vascular structures and transplant-free survival. The prognostic value of the weighted score based on the identified reticulo-vascular structures was assessed using Harrell's C-Index. To investigate the added value of the weighted score based on the identified reticulo-vascular structures, an adjustment was made for lung function parameters in the Cox regression models. Imaging and lung function data were assessed at baseline and follow-up studies. The relative change from baseline to follow-up was also assessed, accounting for the time between the two points.

Data was analysed from 296 IPF patients with a baseline CT, contemporaneous lung function tests and outcome data and of these, 120 patients who also had follow up data. The mean follow-up interval was 54 (SD 13) weeks. At baseline the C-Index was 0.66 for FVC. The weighted score based on the identified reticulo-vascular structures had a C-Index of 0.75. The prognostic performance of the e-ILD weighted score was maintained when additionally adjusting for FVC and DLco.

Patients were dichotomised into low 403 and high 401 e-ILD weighted score groups (as shown in FIG. 5), and low 405 and high 407 FVC groups, using the median value as a threshold. The observed mortality risk was four times greater in the high weighted score group (HR 4.0 CI 2.8-5.7, p<0.001). By categorising patients based on the median FVC of the cohort at 80% predicted, the prognostic performance was half as good (HR 2.0, CI 1.4-2.8, p<0.001). When analysing the prognostic value of the relative change between baseline and follow-up, FVC achieved a C-Index of 0.56 for predicting survival from that point onwards. However, by adding the e-ILD weighted score, this increased to 0.63. Thirty-one patients (22%) experienced a relative FVC decline of at least 10%. The e-ILD WRV score at baseline significantly predicted the likelihood of FVC decline of at least 10% (OR 5.8 CI 1.5-22.3, p=0.01, C-index 0.71).

The data thus suggests that the weighted score based on the identified reticulo-vascular structures derived from a baseline CT scan can better predict outcomes in patients with IPF than FVC even when controlling for lung function parameters. Combining change in the weighted score based on the identified reticulo-vascular structures and FVC between two timepoints outperforms change in FVC alone for predicting outcomes suggesting that imaging and lung function testing identify independent and complementary factors associated with outcomes. Furthermore, the e-ILD weighted score was able to accurately predict patients who subsequently experienced a relative decline in FVC of 10%.

It is thus demonstrated that the e-ILD weighted score predicts lung function decline and survival in IPF patients from a baseline CT scan. In the setting of a clinical trial, combining automated imaging biomarkers with physiology may improve patient selection and definition of treatment response compared to traditional clinico-physiological markers alone.

Figure 6:
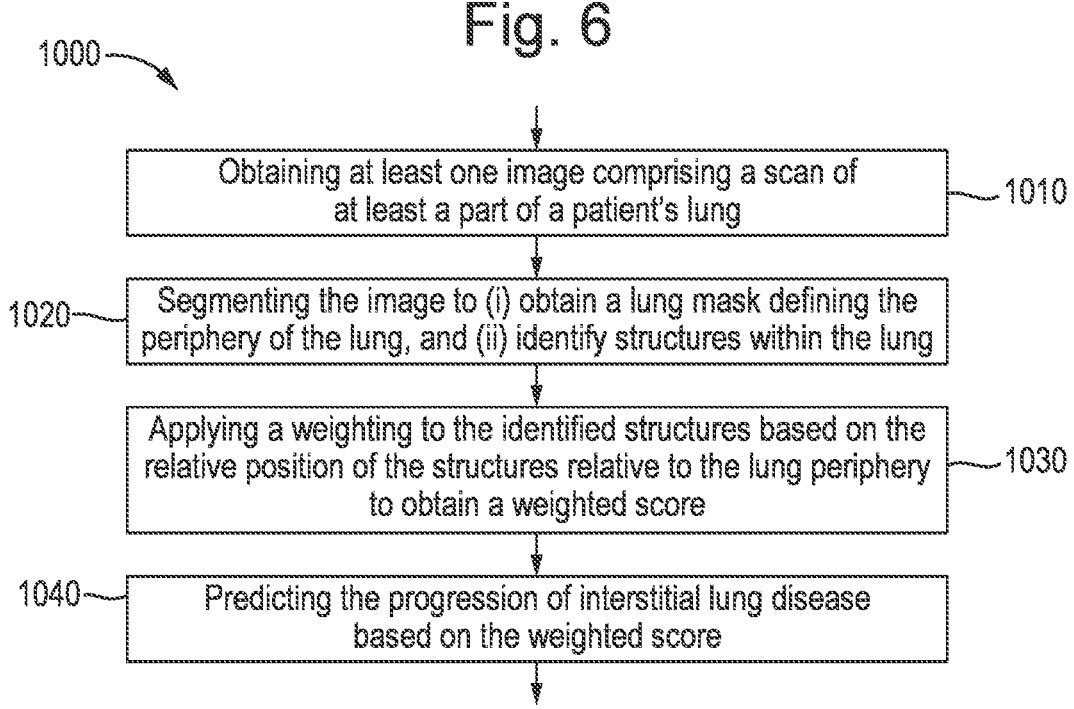
FIG. 6 shows a process flow chart of an example computer implemented method for predicting the progression of interstitial lung disease.

FIG. 6 shows an example flow chart of an example computer implemented method for predicting the progression of interstitial lung disease. As seen in FIG. 6, the method comprises obtaining 1010 at least one image comprising a scan of at least a part of a patient's lung, segmenting 1020 the image to (i) obtain a lung mask defining the periphery of the lung, and (ii) identify structures within the lung, applying 1030 a weighting to the identified structures based on the relative position of the structures relative to the lung periphery to obtain a weighted score, and predicting 1040 the progression of interstitial lung disease based on the weighted score. It will of course be understood that the step of predicting 1040 the progression of interstitial lung disease based on the weighted score may in some examples be optional as it may be performed by a different entity—for example, the model may simply output a weighted score or a quantification of current disease extent in e.g. ml or % and that raw score or value may be used by other parties.

Figure 7:
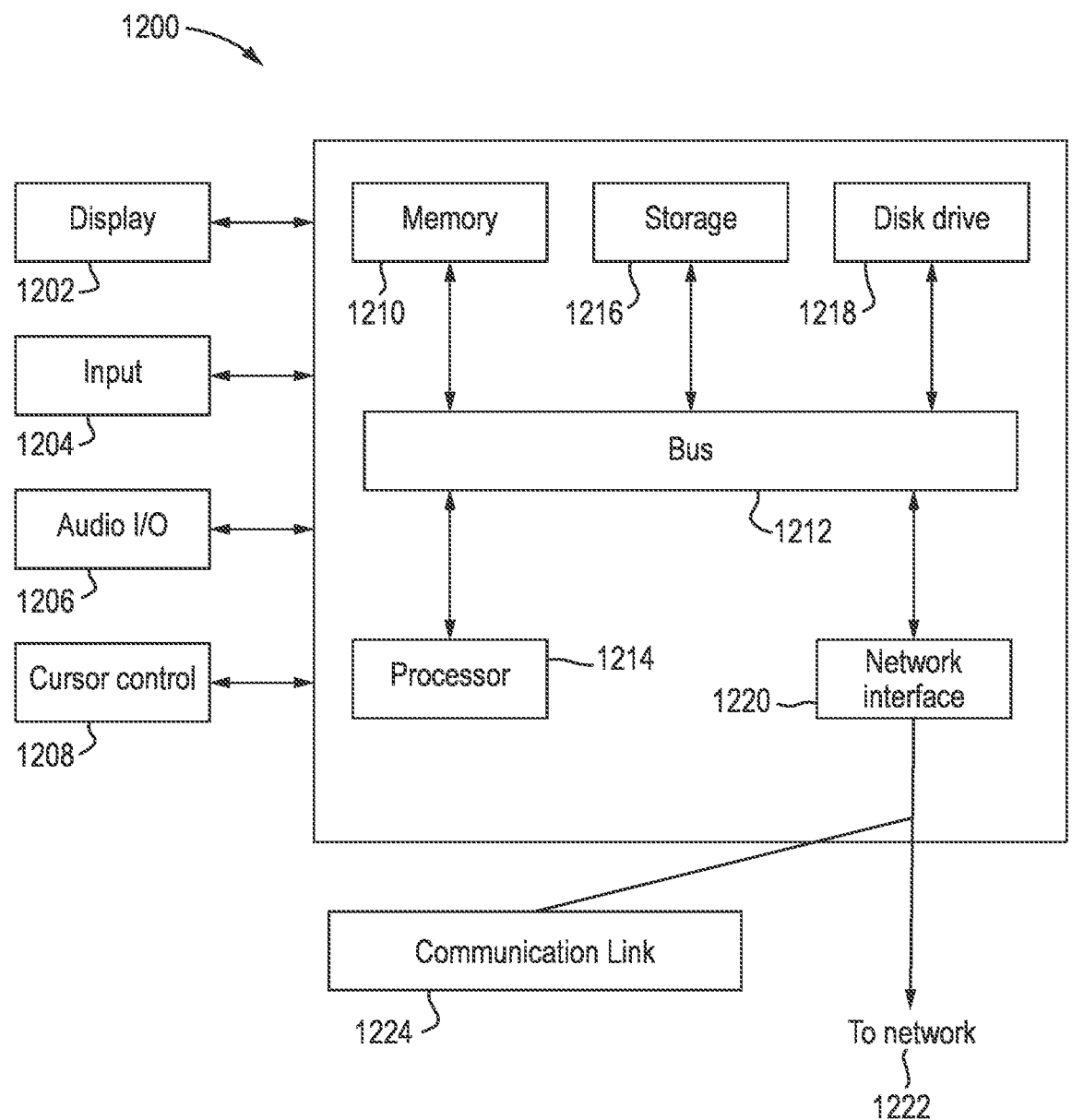
FIG. 7 shows a block diagram of a computer system suitable for implementing one or more embodiments of the present disclosure.

FIG. 7 is a block diagram of a computer system 1200 suitable for implementing one or more embodiments of the present disclosure, including the computer implemented method described above.

The computer system 1200 includes a bus 1212 or other communication mechanism for communicating information data, signals, and information between various components of the computer system 1200. The components include an input/output (I/O) component 1204 that processes a user (i.e., sender, recipient, service provider) action, such as selecting keys from a keypad/keyboard, selecting one or more buttons or links, etc., and sends a corresponding signal to the bus 1212. It may also include an optional camera or other means suitable for obtaining image data such as CT scans (although it will be understood that the image data (e.g., CT scan) may be obtained elsewhere and transmitted to the computer system 1200 for example via the network interface 1220). The I/O component 1204 may also include an output component, such as a display 1202 and a cursor control 1208 (such as a keyboard, keypad, mouse, etc.). The display 1202 may be configured to present a user interface viewing image data such as that shown in FIGS. 1 to 4C. An optional audio input/output component 1206 may also be included to allow a user to use voice for inputting information by converting audio signals. The audio I/O component 1206 may allow the user to hear audio. A transceiver or network interface 1220 transmits and receives signals between the computer system 1200 and other devices, such as another user device, or a remote device that may provide the functionality of a database via network 1222. In one example, the transmission is wireless, although other transmission mediums and methods may also be suitable. A processor 1214, which can be a microcontroller, digital signal processor (DSP), or other processing component, processes these various signals, such as for display on the computer system 1200 or transmission to other devices via a communication link 1224. The processor 1214 may also control transmission of information, such as cookies or IP addresses, to other devices.

The components of the computer system 1200 also include a system memory component 1210 (e.g., RAM), a static storage component 1216 (e.g., ROM), and/or a disk drive 1218 (e.g., a solid-state drive, a hard drive). The computer system 1200 performs specific operations by the processor 1214 and other components by executing one or more sequences of instructions contained in the system memory component 1210. For example, the processor 1214 can run the applications 200, 500 described above.

It will also be understood that the functionality of the computer program may be implemented in software or hardware, for example as dedicated circuitry. For example, it may be implemented as part of a computer system. The computer system may include a bus or other communication mechanism for communicating information data, signals, and information between various components of the computer system. The components may include an input/output (I/O) component that processes a user (i.e., sender, recipient, service provider) action, such as selecting keys from a keypad/keyboard, selecting one or more buttons or links, etc., and sends a corresponding signal to the bus. The I/O component may also include an output component, such as a display and a cursor control (such as a keyboard, keypad, mouse, etc.). A transceiver or network interface may transmit and receive signals between the computer system and other devices, such as another user device or a remote server via a network. In one embodiment, the transmission is wireless, although other transmission mediums and methods may also be suitable. A processor, which can be a microcontroller, digital signal processor (DSP), or other processing component, processes these various signals, such as for display on the computer system or transmission to other devices via a communication link. The processor may also control transmission of information, such as cookies or IP addresses, to other devices.

The components of the computer system may also include a system memory component (e.g., RAM), a static storage component (e.g., ROM), and/or a disk drive (e.g., a solid-state drive, a hard drive). The computer system performs specific operations by the processor and other components by executing one or more sequences of instructions contained in the system memory component.

Logic may be encoded in a computer readable medium, which may refer to any medium that participates in providing instructions to a processor for execution. Such a medium may take many forms, including but not limited to, non-volatile media, volatile media, and transmission media. In various implementations, non-volatile media includes optical or magnetic disks, volatile media includes dynamic memory, such as a system memory component, and transmission media includes coaxial cables, copper wire, and fibre optics. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by a computer system. In various other embodiments of the present disclosure, a plurality of computer systems 600 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

It will also be understood that aspects of the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A computer implemented method for quantifying an extent of interstitial lung disease or predicting its progression, the method comprising:
   obtaining at least one image based on a scan of at least a part of a patient's lung, wherein each of the at least one image includes a plurality of pixels or voxels;
   segmenting the at least one image to generate a lung mask, the lung mask having been generated by analyzing, via a trained machine learning model, the at least one image to determine periphery structures, background regions, and reticulo-vascular structures;
   applying a weighting to each of the plurality of pixels or voxels associated with the determined reticulo-vascular structures based on a relative position of the determined reticulo-vascular structures relative to the determined periphery structures to obtain a weighted score; and
   based on the weighting of each of the plurality of pixels or voxels associated with the determined reticulo-vascular structures, at least one of:
      quantifying an extent of interstitial lung disease, or
      predicting a progression of interstitial lung disease over time.

2. The computer implemented method of claim 1, wherein applying the weighting to each of the plurality of pixels or voxels associated with the determined reticulo-vascular structures based on the relative position of the determined reticulo-vascular structures relative to the determined periphery structures to obtain the weighted score comprises applying a weighting only if the determined reticulo-vascular structure is within a selected threshold distance of the determined periphery structures.

3. The computer implemented method of claim 1, wherein the segmenting the at least one image to generate a lung mask comprises determining the periphery structures by identifying a pleural boundary and any lung masses within or attached to the pleural boundary.

4. The computer implemented method of claim 1, wherein the lung mask identifies portions of the at least one image which are part of a normal lung parenchyma.

5. The computer implemented method of claim 1, wherein segmenting the at least one image to generate the lung mask comprises identifying the reticulo-vascular structures comprising at least one of: pulmonary vessels and reticulation.

6. The computer implemented method of claim 1, further comprising dividing the at least one image into a plurality of different portions,
   wherein the applying the weighting to each of the plurality of pixels or voxels associated with the determined reticulo-vascular structures based on the relative position of the determined reticulo-vascular structures relative to the determined periphery structures to obtain the weighted score comprises applying the weighting to each portion of the at least one image comprising the determined reticulo-vascular structure based on the relative position of the determined reticulo-vascular structure relative to the determined periphery structures.

7. The computer implemented method of claim 6, wherein predicting the progression of interstitial lung disease over time comprises predicting the progression of interstitial lung disease based on a sum of the weighted scores for each of the plurality of pixels or voxels associated with the determined reticulo-vascular structures.

8. The computer implemented method of claim 7, wherein the sum of the weighted scores is further predicted for all portions of the image.

9. The computer implemented method of claim 7, further comprising multiplying the sum of the weighted scores by a volume of each voxel.

10. The computer implemented method of claim 1, wherein the obtaining the at least one image based on the scan of the at least part of the patient's lung comprises obtaining a plurality of slices through the patient's lung.

11. The computer implemented method of claim 10, further comprising creating a three-dimensional model based on the plurality of slices through the patient's lung.

12. The computer implemented method of claim 11, wherein:
   segmenting the at least one image to generate the lung mask comprises segmenting the three-dimensional model to obtain a three-dimensional lung mask defining the periphery structures, the background regions, and the reticulo-vascular structures,
   wherein applying the weighting to each of the plurality of pixels or voxels associated with the determined reticulo-vascular the structures based on the relative position of the determined reticulo-vascular structures relative to the determined periphery structures to obtain the weighted score comprises determining the relative position of the determined reticulo-vascular structures relative to the periphery of the three-dimensional model.

13. The computer implemented method of claim 12, wherein determining the relative position of the determined reticulo-vascular structures within the three-dimensional model comprises applying a distance transform to determine the distance from the determined periphery structures of the three-dimensional model.

14. The computer implemented method of claim 10, wherein segmenting the at least one image to generate the lung mask comprises segmenting each slice to obtain a lung mask defining the periphery structures for each slice; further comprises:
   creating a three-dimensional model based on the plurality of slices through the patient's lung and feeding the lung mask and the periphery structure for each slice into the three-dimensional model,
   wherein applying the weighting to each of the plurality of pixels or voxels associated with the determined reticulo-vascular structures based on the relative position of the determined reticulo-vascular structures relative to the determined periphery structures to obtain the weighted score comprises determining the relative position of the determined reticulo-vascular structures relative to the periphery structure of the three-dimensional model.

15. A computer readable non-transitory storage medium comprising a program for a computer configured to cause a processor to perform the method of claim 1.

* * * * *